(12) United States Patent
Liu et al.

(10) Patent No.: US 12,203,869 B2
(45) Date of Patent: Jan. 21, 2025

(54) LIGHTING FIXTURE AND MULTI-STATION LIGHTING SYSTEM

(71) Applicant: Suzhou China Star Optoelectronics Technology Co., Ltd., Jiangsu (CN)

(72) Inventors: Lili Liu, Jiangsu (CN); Jun Wang, Jiangsu (CN)

(73) Assignee: Suzhou China Star Optoelectronics Technology Co., Ltd., Suzhou (CN)

( * ) Notice: Subject to any disclaimer, the term of this patent is extended or adjusted under 35 U.S.C. 154(b) by 0 days.

(21) Appl. No.: 17/622,873

(22) PCT Filed: Dec. 16, 2021

(86) PCT No.: PCT/CN2021/138828
§ 371 (c)(1),
(2) Date: Dec. 27, 2021

(87) PCT Pub. No.: WO2023/103011
PCT Pub. Date: Jun. 15, 2023

(65) Prior Publication Data
US 2024/0035985 A1   Feb. 1, 2024

(30) Foreign Application Priority Data

Dec. 9, 2021   (CN) .......................... 202111498854.3

(51) Int. Cl.
*G01R 31/26*   (2020.01)
*G01N 21/95*   (2006.01)
(Continued)

(52) U.S. Cl.
CPC ........... *G01N 21/95* (2013.01); *G09F 9/3026* (2013.01)

(58) Field of Classification Search
CPC ........ G01R 31/02; G01R 31/26; G01R 31/28; G01R 31/31; G01R 1/02; G01R 1/04; G01R 1/067; G01R 1/073; G01N 21/95
See application file for complete search history.

(56) References Cited

U.S. PATENT DOCUMENTS 11,215,522 B2 *   1/2022   Lee .......................... G06F 3/14
2016/0133171 A1   5/2016   Li et al.
2017/0074940 A1   3/2017   Li et al.

FOREIGN PATENT DOCUMENTS

CN   203811937   9/2014
CN   104570411   4/2015
(Continued)

OTHER PUBLICATIONS

Cai et al. "Safety Evaluation of Airworthiness Requirement of Bird-Strike on Aeroplane", Engineering Failure Analysis, 102: 407-416, Aug. 31, 2019. English Abstract.
(Continued)

*Primary Examiner* — Neel D Shah (57) ABSTRACT

A lighting fixture and a multi-station lighting system are provided. The lighting fixture includes: a body module, an adjustment module, a test module, a carrier module, a connecting wire, and a control device. A display screen is mounted on the carrier module, and the test module corresponding to the display screen is mounted on the adjustment module. A first detection point of the test module is correspondingly connected to a second detection point on the display screen through the adjustment module.

13 Claims, 10 Drawing Sheets

(51) Int. Cl.
G01R 1/02 (2006.01)
G01R 1/04 (2006.01)
G01R 1/067 (2006.01)
G01R 1/073 (2006.01)
G01R 31/28 (2006.01)
G09F 9/302 (2006.01)

(56) References Cited

FOREIGN PATENT DOCUMENTS

| | | | | |
|---|---|---|---|---|
| CN | 104764959 | | 7/2015 | |
| CN | 204614405 | | 9/2015 | |
| CN | 206540966 | | 10/2017 | |
| CN | 207764505 | | 8/2018 | |
| CN | 108717238 | * | 10/2018 | ........... G02F 1/1309 |
| CN | 109061915 | | 12/2018 | |
| CN | 109581703 | | 4/2019 | |
| CN | 208888283 | | 5/2019 | |
| CN | 210347851 | | 4/2020 | |
| CN | 213274781 | | 5/2021 | |
| KR | 10-2004-0098985 | | 11/2004 | |

OTHER PUBLICATIONS

Song et al. "Design of ICT Test Fixture With New Modular Structure", Tool Technology, 9: 1-2, Sep. 20, 2015. English Abstract.
Yang et al. "Testing Platform for XDZ-B Type Multifunction Signal Lighting Device", Railway Computer Application, 26(4): 57-60, Apr. 25, 2017. English Abstract.

* cited by examiner

LIGHTING FIXTURE AND MULTI-STATION LIGHTING SYSTEM

RELATED APPLICATIONS

This application is a National Phase of PCT Patent Application No. PCT/CN2021/138828 having International filing date of Dec. 16, 2021, which claims the benefit of priority of Chinese Patent Application No. 202111498854.3 filed on Dec. 9, 2021. The contents of the above applications are all incorporated by reference as if fully set forth herein in their entirety.

FIELD AND BACKGROUND OF THE INVENTION

The present application relates to the field of display technologies, and more particularly to a lighting fixture and a multi-station lighting system.

According to market demand, companies usually produce displays of different specifications with similar functions and similar appearances. In order to ensure product quality, it is necessary to perform a lighting test (English full name: light on inspection, LOI) on a display screen through a lighting detection equipment. A lighting test stage is very important for quality control of the display screen. In this stage, it can be detected whether the display screen has bad dots (for example: bright or dark dots), dirt, scratches, and other quality problems. Furthermore, bad display screens are intercepted in time to avoid waste of resources, and a manufacturing process can be improved as soon as possible.

Technical Problem

At present, lighting fixtures used in the industry light up one display screen at a time. One lighting fixture can only test one product, which is dedicated for special machines, and the lighting efficiency is low. When switching display screens of different specifications for testing, the entire jig needs to be replaced. This takes a long time and a replacement efficiency is low. The current lighting fixtures have a long production cycle, and there is a risk that they cannot meet production requirements in time. Further, the lighting fixtures are expensive. Moreover, display screens of different specifications correspond to a lighting fixture. This leads to a large variety and quantity of lighting fixtures, and the lighting fixtures seriously occupy an inventory space.

SUMMARY OF THE INVENTION

The purpose of the present invention is to provide a lighting fixture and a multi-station lighting system, which can solve the problems of low lighting efficiency, high cost, long production cycle, low replacement efficiency, and occupation of inventory space in the existing lighting fixture.

In order to solve the above-mentioned problems, the present invention provides a lighting fixture for lighting a display screen, which includes: a body module; an adjustment module detachably mounted on the body module; a test module detachably mounted on the adjustment module; a carrier module mounted on the body module; a connecting wire connecting the test module and the body module; and a control device connected to the body module; wherein the display screen is detachably mounted on the carrier module.

Further, the adjustment module comprises: an adjustment module body detachably mounted on the body module; an Y-direction slider slidably connected to the adjustment module body; a X-direction slider slidably connected to the Y-direction slider; and a connecting male end protruding from a side of the X-direction slider away from the adjustment module body, and being located at an end of the X-direction slider close to the test module.

Further, the test module comprises: a test module body; a connecting female end disposed on the test module body and correspondingly connected to the connecting male end; a first detection point set on the test module body; and a first aviation socket disposed on the test module body.

Further, the display screen has a second detection point, and the second detection point is correspondingly connected to the first detection point.

Further, the lighting fixture further comprises a second aviation socket on the body module; wherein the connecting wire connects the first aviation socket and the second aviation socket.

Further, the adjustment module further comprises: an X-direction cylinder slider slidably connected to the X-direction slider; an X-direction cylinder mounted on the X-direction cylinder slider to drive the X-direction cylinder slider to slide.

Further, the X-direction cylinder comprises: an X-direction cylinder barrel located in the X-direction cylinder slider; an X-direction piston located in the X-direction cylinder barrel; an X-direction piston rod, wherein one end of the X-direction piston rod is connected to the X-direction piston, and another end of the X-direction piston rod is fixed to an end of the X-direction cylinder slider away from the test module; a first air pipe connected to an end of the X-direction cylinder barrel away from the test module; and a second air pipe connected to an end of the X-direction cylinder barrel close to the test module.

Further, the adjustment module further comprises: a lower clamping block mounted on the X-direction cylinder slider; an upper clamping block disposed opposite to the lower clamping block; a connecting shaft connecting the upper clamping block and the lower clamping block; an indenter detachably mounted on an end of the upper clamping block close to the test module; an elastic member located at an end of the upper clamping block away from the test module and connected between the upper clamping block and the lower clamping block.

Further, the adjustment module further comprises: at least one Z-direction cylinder mounted on the X-direction cylinder slider; the Z-direction cylinder comprises: a Z-direction cylinder barrel located in the X-direction cylinder slider; a Z-direction piston located in the Z-direction cylinder barrel; a Z-direction piston rod, wherein an end of the Z-direction piston rod is connected to the Z-direction piston, and another end of the Z-direction piston rod abuts against a surface of the upper clamping block on a side facing the lower clamping block; and a third air pipe connected to a bottom of the Z-direction cylinder barrel.

Further, the adjustment module further comprises: a first adjustment device configured to drive the Y-direction slider to slide; the first adjustment device comprises: two first supports respectively mounted at both ends of the Y-direction slider; a first adjusting screw rod rotatably connected to the two first supports; and two first adjusting bolts respectively connected to both ends of the first adjusting screw rod; wherein the Y-direction slider is provided with a first threaded hole matched with the first adjusting screw.

Further, the adjustment module further comprises: a second adjustment device configured to drive the X-direction slider to slide; the second adjustment device comprises: a second support mounted at an end of the X-direction slider away from the test module; a second adjusting screw rod rotatably connected to the second support; and a second adjusting bolt connected to an end of the second adjusting screw rod away from the test module; wherein the X-direction slider is provided with a second threaded hole matched with the second adjusting screw.

Further, the adjustment module further comprises: a first fixing screw mounted on the first support and used to lock or loosen the first adjusting screw; and a second fixing screw mounted on the second support and used to lock or loosen the second adjusting screw.

Further, the adjustment module further comprises: a first cross roller guide rail disposed between the Y-direction slider and the adjustment module body; a second cross roller guide rail disposed between the X-direction slider and the Y-direction slider.

In order to solve the above-mentioned problems, the present invention provides a multi-station lighting system, which includes: a plurality of mutually spliced lighting fixtures related to the present invention; and a master control device connected to the control device of each lighting fixture.

Beneficial Effect

In the lighting fixture of the present invention, the display screen is installed on the carrier module. The test module corresponding to the display screen is installed on the adjustment module. The first detection point of the test module is correspondingly connected to the second detection point on the display screen through the adjustment module. The lighting fixture of the present invention can accurately adjust and quickly switch display screens of different specifications for lighting test. This reduces the replacement time of the lighting fixtures during the lighting test of displays of different specifications, improves the replacement efficiency, improves the versatility of the lighting fixtures, and improves the repetition rate of the lighting fixtures. This reduces the cost of lighting fixtures. This reduces the types of lighting fixtures and reduces the occupation of the company's inventory space. This reduces the production cost of the enterprise.

The present invention can correspondingly connect the first detection point of the test module to the second detection point on the display screen through the adjustment module, which can improve the alignment accuracy of the first detection point and the second detection point and improve the detection efficiency.

The multi-station lighting system of the present invention is spliced by multiple lighting fixtures to light up multiple display screens of multiple specifications at a time or multiple display screens of the same specification at a time, thereby improving lighting efficiency.

BRIEF DESCRIPTION OF THE SEVERAL VIEWS OF THE DRAWINGS

In order to illustrate the technical solutions more clearly in the embodiments of the present application, the following will briefly introduce the drawings that need to be used in the description of the embodiments. Obviously, the drawings in the following description are only some embodiments of the present application. For those skilled in the art, without creative work, other drawings can be obtained based on these drawings.

DESCRIPTION OF REFERENCE SIGNS

100 Multi-station lighting system; 200 Display screen;
110 Lighting fixture; 120 Master control device;
1 Body module; 2 Adjustment module;
3 Test module; 4 Carrier module;
5 Control device;
101 Second aviation socket;
201 Adjustment module body; 202 Y-direction slider;
203 First cross roller guide rail; 204 First adjustment device;
205 First fixing screw; 206 X-direction slider;
207 Second cross roller guide rail; 208 Second adjustment device;
209 Second fixing screw; 210 X-direction cylinder slider;
211 X-direction cylinder; 212 Lower clamping block;
213 Upper clamping block; 214 Connecting shaft
215 Pressure head; 216 Elastic piece;
217 Z-direction cylinder; 218 Connecting male end;
219 Adapter board;
2021 First threaded hole;
2041 First support; 2042 First adjusting screw;
2043 First adjusting bolt;
2061 Second threaded hole;
2081 Second support; 2082 Second adjusting screw;
2083 Second adjusting bolt;
2111 X-direction cylinder barrel; 2112 X-direction piston;
2113 X-direction piston rod; 2114 First air pipe;
2115 Second air pipe;
2171 Z-direction cylinder barrel; 2172 Z-direction piston;
2173 Z-direction piston rod; 2174 Third air pipe;
301 Test module body; 302 Connecting female end;
303 First detection point; 304 First aviation socket;
2001 Second detection point

DESCRIPTION OF SPECIFIC EMBODIMENTS OF THE INVENTION

Hereinafter, the preferred embodiments of the present invention will be described in detail with reference to the accompanying drawings of the specification, so as to fully introduce the technical content of the present invention to those skilled in the art. Taking an example to prove that the present invention can be implemented makes the technical content disclosed by the present invention clearer. This makes it easier for those skilled in the art to understand how to implement the present invention. However, the present invention can be embodied in many different forms of embodiments. The protection scope of the present invention is not limited to the embodiments mentioned in the text, and the description of the following embodiments is not used to limit the scope of the present invention.

Directional terms mentioned in the present invention, such as "upper", "lower", "front", "rear", "left", "right", "inner", "outer", "side", etc., are only the directions for referring to the attached drawings. Therefore, the directional terms used are used to describe and understand the present invention, rather than to limit the present invention.

In the drawings, components with the same structure are denoted by the same numerals. Components with similar structures or functions are represented by similar numerals. In addition, for ease of understanding and description, the size and thickness of each component shown in the drawings are arbitrarily shown. The present invention does not limit the size and thickness of each component.

Embodiment 1

Figure 1:
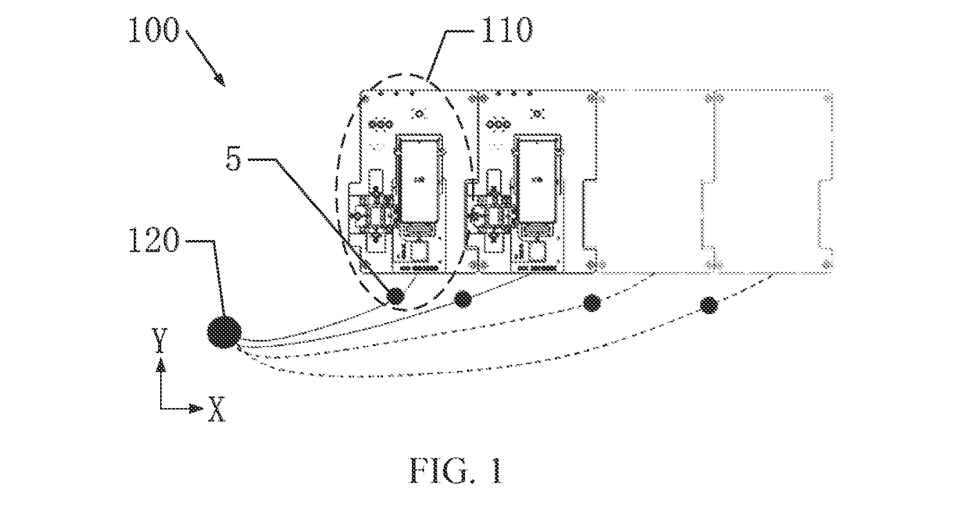
FIG. 1 is a schematic plan view of a multi-station lighting system of a first embodiment.

As shown in FIG. 1, this embodiment provides a multi-station lighting system 100. The multi-station lighting system 100 includes a plurality of lighting fixtures 110 and a master control device 120.

In this embodiment, a plurality of lighting fixtures 110 are spliced with each other and arranged along an X direction.

The master control device 120 is connected to a control device 5 of each lighting fixture 110. Further, the master control device 120 controls lighting and closing of all the lighting fixtures 110 of the multi-station lighting system 100.

The multi-station lighting system 100 of this embodiment is spliced by a plurality of lighting fixtures 110 to light up display screens 200 of multiple specifications at a time or multiple display screens 200 of the same specification at a time to improve lighting efficiency.

Figure 2:
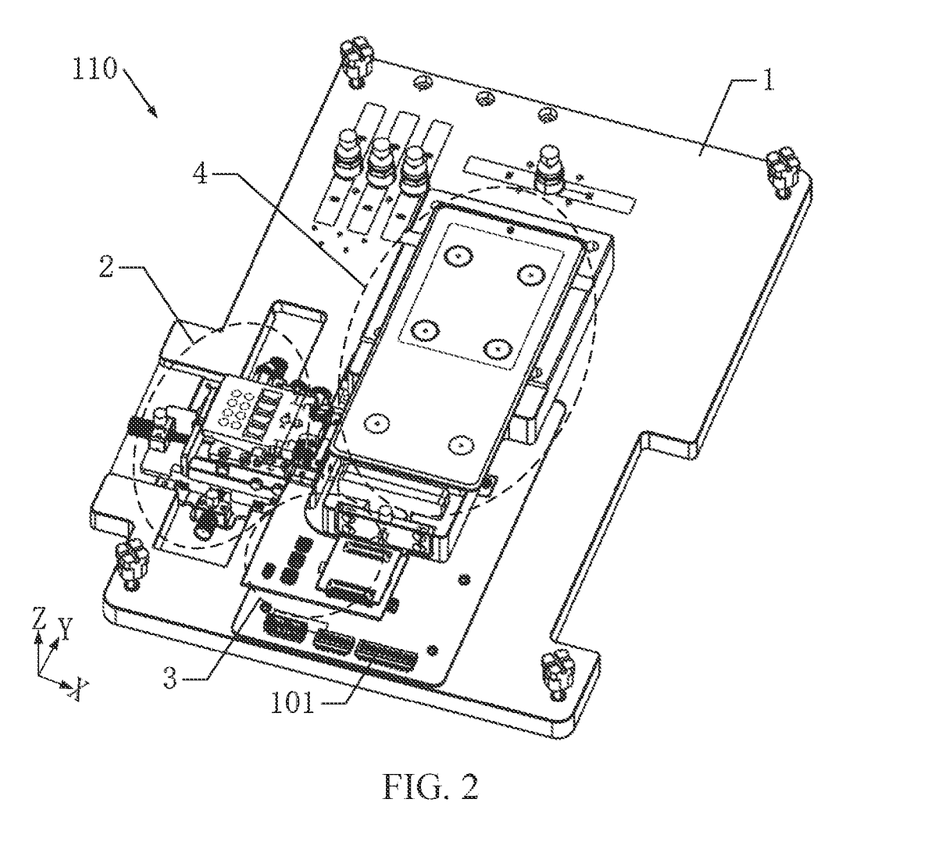
FIG. 2 is a schematic diagram of a three-dimensional structure of a lighting fixture of the present invention.

As shown in FIG. 1 and FIG. 2, the lighting fixture 110 is mainly used for lighting the display screen 200. The lighting fixture 110 includes a body module 1, an adjustment module 2, a test module 3, a carrier module 4, and a control device 5.

As shown in FIG. 2, the body module 1 has a second aviation socket 101. The body module 1 has scale lines (not shown in the figure).

Figure 3:
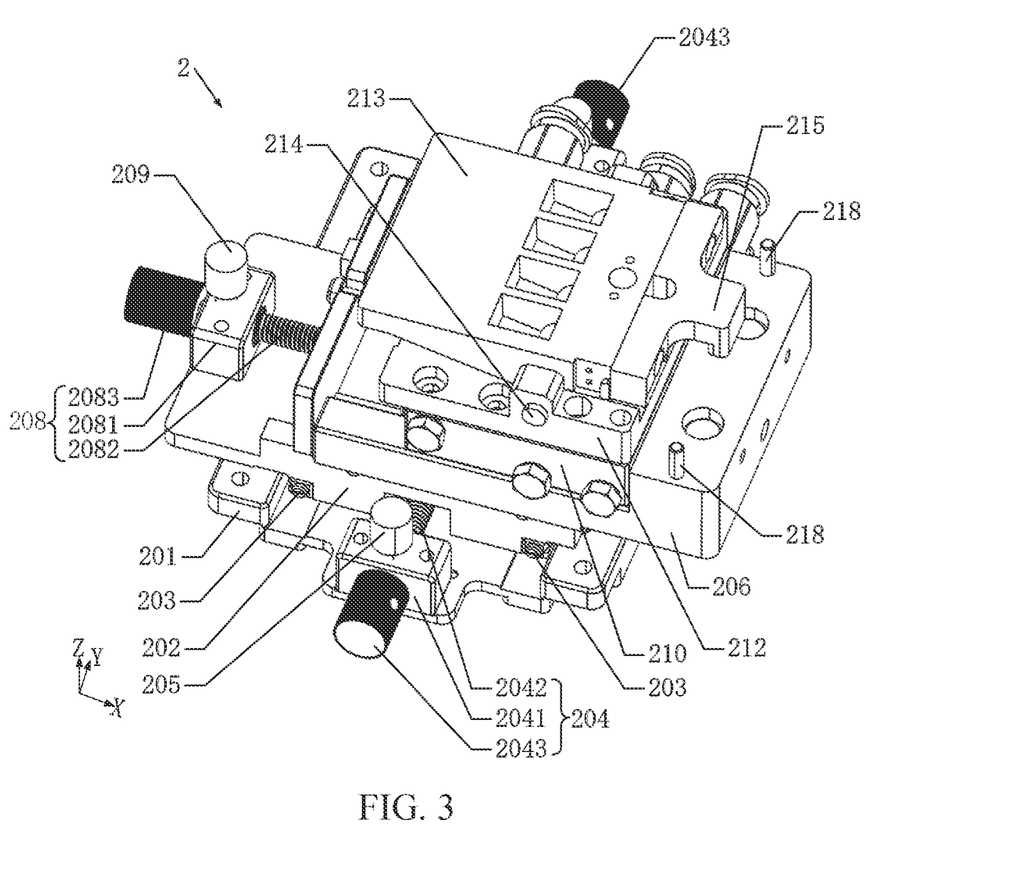
FIG. 3 is a schematic diagram 1 of a three-dimensional structure of an adjustment module of a lighting fixture of the present invention.

As shown in FIG. 3, the adjustment module 2 is detachably installed on the body module 1. The adjustment module 2 includes: an adjustment module body 201, a Y-direction slider 202, a first cross roller guide rail 203, a first adjustment device 204, a first fixing screw 205, an X-direction slider 206, a second cross roller guide rail 207, a second adjustment device 208, a second fixing screw 209, an X-direction cylinder slider 210, an X-direction cylinder 211, a lower clamping block 212, an upper clamping block 213, a connecting shaft 214, a pressure head 215, an elastic member 216, at least one Z-direction cylinder 217, and a connecting male end 218.

The adjustment module body 201 is detachably mounted on the body module 1. In this embodiment, the adjustment module body 201 is fixed to the body module 1 by screws.

The Y-direction slider 202 is slidably connected to the adjustment module body 201. The Y-direction slider 202 can slide along the Y-direction.

The first cross roller guide rail 203 is arranged between the Y-direction slider 202 and the adjustment module body 201. In this embodiment, the Y-direction slider 202 is slidably connected with the adjustment module body 201 through the first cross roller guide rail 203.

The first adjustment device 204 is used to drive the Y-direction slider 202 to slide. The first adjustment device 204 includes: two first supports 2041, a first adjusting screw 2042, and two first adjusting bolts 2043.

Two first supports 2041 are respectively installed at two ends of the Y-direction slider 202. The first adjusting screw 2042 is rotatably connected to the two first supports 2041. Two first adjusting bolts 2043 are connected to two ends of the first adjusting screw 2042 respectively.

Figure 4:
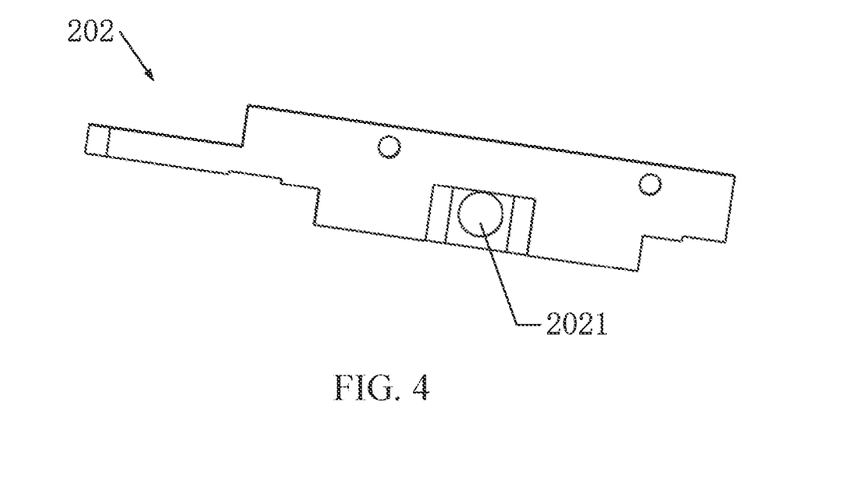
FIG. 4 is a schematic diagram of a structure of a Y-direction slider of an adjustment module of the present invention.

As shown in FIG. 4, the Y-direction slider 202 is provided with a first threaded hole 2021 matched with the first adjusting screw 2042.

By rotating the first adjusting bolt 2043, the first adjusting bolt 2043 drives the first adjusting screw 2042 to rotate, and the first adjusting screw 2042 drives the Y-directional slider 202 to slide through the first threaded hole 2021. The Y-direction slider 202 can be precisely adjusted according to a scale line on the body module 1 to improve an alignment accuracy of the first detection point 303 and the second detection point 2001.

The first fixing screw 205 is installed on the first support 2041. The first fixing screw 205 is mainly used to lock or loosen the first adjusting screw 2042.

The X-direction slider 206 is slidably connected to the Y-direction slider 202. The X-direction slider 206 can slide along the X-direction.

Figure 5:
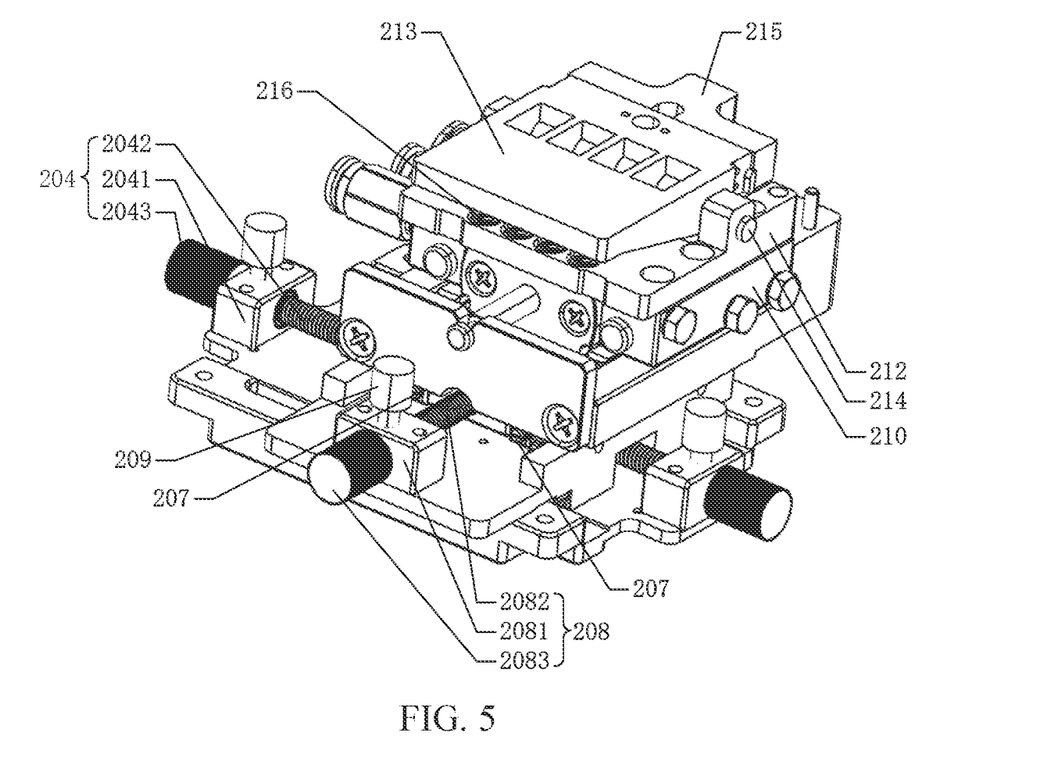
FIG. 5 is a second three-dimensional structural diagram of an adjustment module of a lighting fixture of the present invention.

As shown in FIG. 5, the second cross roller guide rail 207 is provided between the X-direction slider 206 and the Y-direction slider 202. In this embodiment, the slidable connection between the X-direction slider 206 and the Y-direction slider 202 is realized through the second cross roller guide rail 207.

As shown in FIG. 3 and FIG. 5, the second adjustment device 208 drives the X-direction slider 206 to slide. The second adjustment device 208 includes: a second support 2081, a second adjusting screw 2082, and a second adjusting bolt 2083.

As shown in FIG. 2, FIG. 3, and FIG. 5, the second support 2081 is installed at an end of the X-direction slider 206 away from the test module 3. The second adjusting screw 2082 is rotatably connected to the second support 2081. The second adjusting bolt 2083 is connected to an end of the second adjusting screw 2082 far away from the test module 3.

Figure 6:
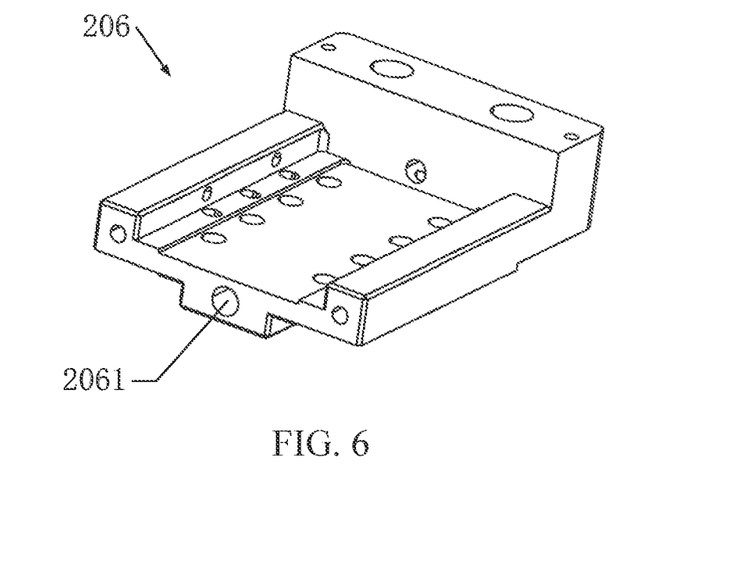
FIG. 6 is a schematic diagram of a structure of an X-direction slider of an adjustment module of the present invention.

As shown in FIG. 6, the X-direction slider 206 is provided with a second threaded hole 2061 matched with the second adjusting screw 2082.

By rotating the second adjusting bolt 2083, the second adjusting bolt 2083 drives the second adjusting screw 2082 to rotate, and the second adjusting screw 2082 drives the X-direction slider 206 to slide through the second threaded hole 2061. The X-direction slider 206 can be precisely adjusted according to the scale line on the body module 1 to improve the alignment accuracy of the first detection point 303 and the second detection point 2001.

The second fixing screw 209 is installed on the second support 2081 for locking or loosening the second adjusting screw 2082.

The X-direction cylinder slider 210 is slidably connected to the X-direction slider 206.

Figure 7:
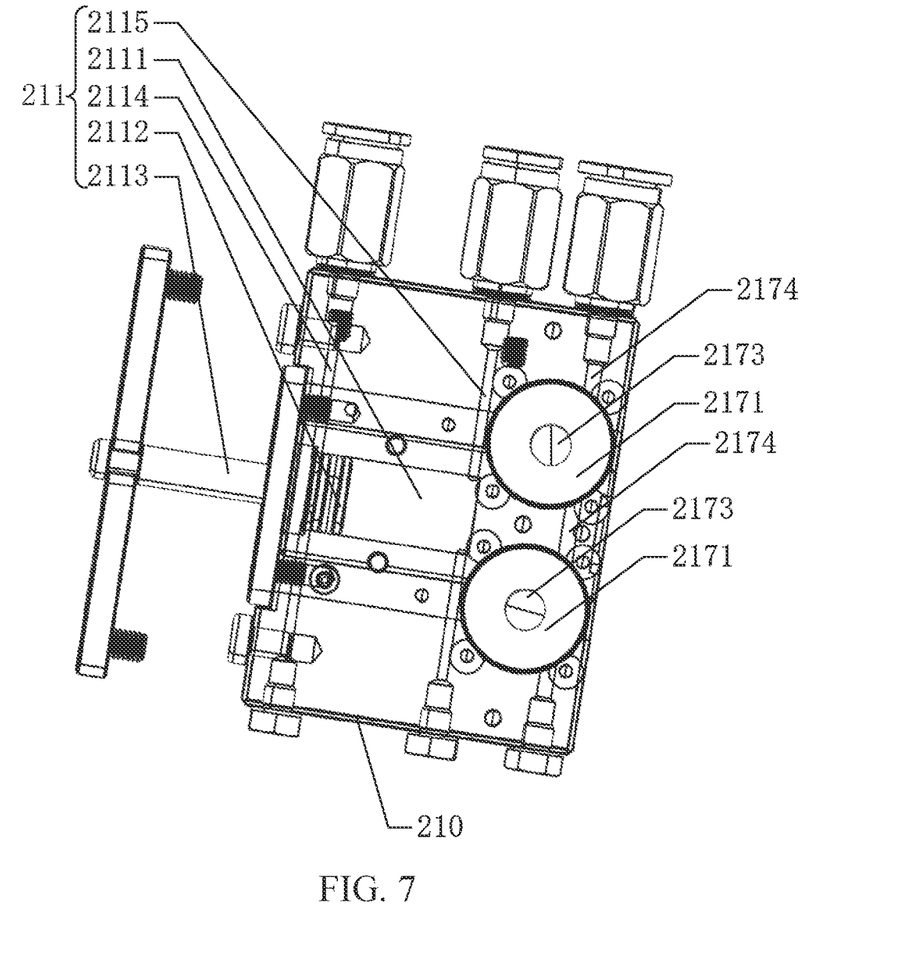
FIG. 7 is a structural diagram 1 of an X-direction cylinder and a Z-direction cylinder of an adjustment module of the present invention.

As shown in FIG. 7, the X-direction cylinder 211 is installed on the X-direction cylinder slider 210 to drive the X-direction cylinder slider 210 to slide. The X-direction cylinder 211 includes: an X-direction cylinder barrel 2111, an X-direction piston 2112, an X-direction piston rod 2113, a first air pipe 2114, and a second air pipe 2115.

As shown in FIG. 3, FIG. 5, and FIG. 7, the X-direction cylinder barrel 2111 is located in the X-direction cylinder slider 210. The X-direction piston 2112 is located in the X-direction cylinder barrel 2111. One end of the X-direction piston rod 2113 is connected to the X-direction piston 2112, and the other end is fixed to the end of the X-direction cylinder slider 210 away from the test module 3. The first air pipe 2114 is connected to an end of the X-direction cylinder barrel 2111 away from the test module 3. The second air pipe 2115 is connected to one end of the X-direction cylinder barrel 2111 close to the test module 3.

Specifically, the first air pipe 2114 takes air into the X-direction cylinder barrel 2111, and the second air pipe 2115 exhausts outward, pushing the X-direction piston 2112 to move toward the test module 3. Since one end of the X-direction piston rod 2113 is connected to the X-direction piston 2112, the other end is fixed to the end of the X-direction cylinder slider 210 away from the test module 3. The X-direction piston 2112 moves toward the test module 3 and drives the X-direction cylinder slider 210 to slide away from the test module 3.

Specifically, the second air pipe 2115 is used to enter the X cylinder barrel 2111, and the first air pipe 2114 exhausts outward, pushing the X piston 2112 to move away from the test module 3. Since one end of the X-direction piston rod 2113 is connected to the X-direction piston 2112, the other end is fixed to the end of the X-direction cylinder slider 210 away from the test module 3. The X-direction piston 2112 moves away from the test module 3 and drives the X-direction cylinder slider 210 to slide toward the test module 3.

The lower clamping block 212 is installed on the X-direction cylinder slider 210. Specifically, the lower clamping block 212 may be fixed on the X-direction cylinder slider 210 by screws.

The upper clamping block 213 is arranged opposite to the lower clamping block 212.

The connecting shaft 214 connects the upper clamping block 213 and the lower clamping block 212. The upper clamping block 213 can rotate around the connecting shaft 214.

The indenter 215 is detachably installed at an end of the upper clamping block 213 close to the test module 3. Specifically, the indenter 215 may be fixed to an end of the upper clamping block 213 close to the test module 3 by screws.

The elastic member 216 is located at an end of the upper clamping block 213 away from the test module 3 and connected between the upper clamping block 213 and the lower clamping block 212. In this embodiment, the elastic member 216 is a spring.

In this embodiment, the adjustment module 2 includes two Z-direction cylinders 217. The two Z-direction cylinders 217 are arranged along the Y direction.

Figure 8:
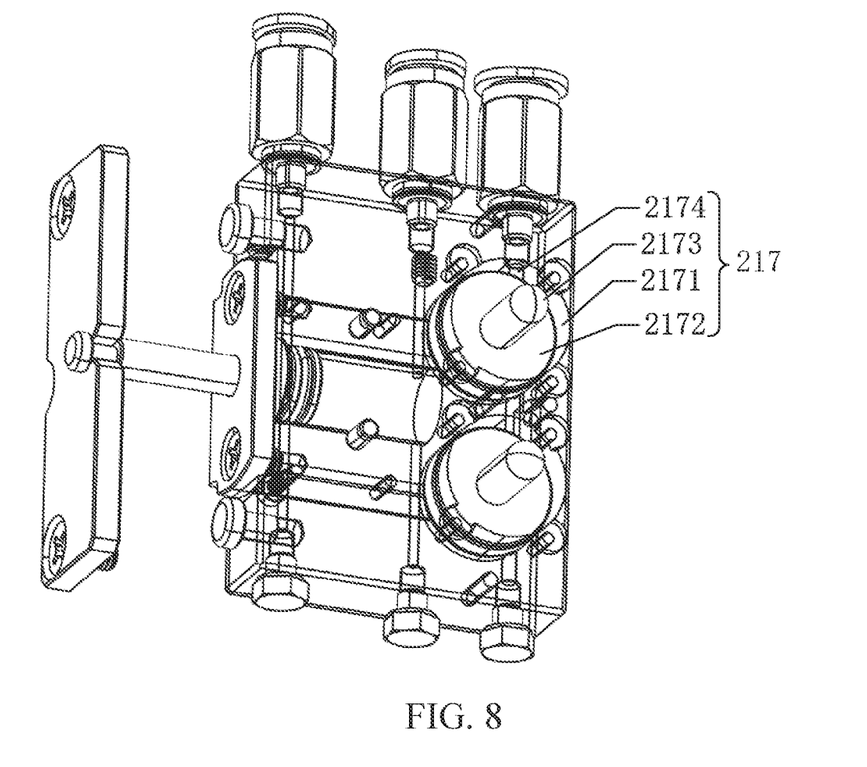
FIG. 8 is a second structural diagram of an X-direction cylinder and a Z-direction cylinder of an adjustment module of the present invention.

As shown in FIG. 8, the Z-direction cylinder 217 is installed on the X-direction cylinder slider 210. The Z-direction cylinder 217 includes: a Z-direction cylinder barrel 2171, a Z-direction piston 2172, a Z-direction piston rod 2173, and a third air pipe 2174.

As shown in FIGS. 7 and 8, the Z-direction cylinder barrel 2171 is located in the X-direction cylinder slider 210. The Z-direction piston 2172 is located in the Z-direction cylinder barrel 2171. One end of the Z-direction piston rod 2173 is connected to the Z-direction piston 2172, and the other end abuts against the surface of the upper clamping block 213 facing the lower clamping block 212. The third air pipe 2174 is connected to the bottom of the Z-direction cylinder barrel 2171.

A two-position two-way valve (not shown in the figure) is connected to the third air pipe 2174. The two-position two-way valve is opened, a gas path is connected, air is taken into the Z-direction cylinder barrel 2171, and the Z-direction piston 2172 is pushed upward. The Z-direction piston 2172 pushes the Z-direction piston rod 2173 to move upward. The end of the Z-direction piston rod 2173 away from the Z-direction piston 2172 pushes up the end of the upper clamping block 213 close to the test module 3. The elastic member 216 is in a compressed state. The upper clamping block 213 drives the indenter 215 to lift up. The two-position two-way valve is closed, the air path is not connected, and the Z-direction cylinder barrel 2171 is exhausted to the outside through the third air pipe 2174. Under the combined action of a force generated by the third air pipe 2174 exhausting outward, a weight of the Z-direction piston 2172, and a resilience force of the elastic member 216, the Z-direction piston 2172 moves downward. The Z-direction piston 2172 drives the Z-direction piston rod 2173 to move downward, and the upper clamping block 213 closes to the end of the test module 3 to descend, driving the indenter 215 to descend.

The connecting male end 218 protrudes from a side of the X-direction slider 206 away from the adjustment module body 201 and is located at an end of the X-direction slider 206 close to the test module 3. In this embodiment, the connecting male end 218 is a pin.

Figure 9:
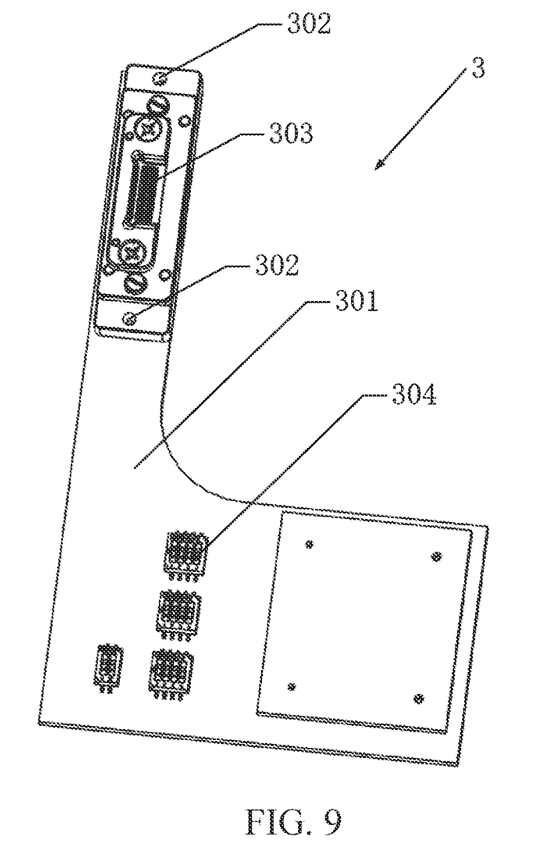
FIG. 9 is a schematic diagram of a three-dimensional structure of a test module of a lighting fixture of the present invention.

As shown in FIG. 9, the test module 3 is detachably installed on the adjustment module 2. The test module 3 includes: a test module body 301, a connecting socket 302, a first detection point 303, and a first aviation socket 304.

The connecting female end 302 is arranged on the test module body 301 and is correspondingly connected to the connecting male end 218. In this embodiment, the connecting female end 302 is a pin hole. The connecting female end 302 is sleeved on the connecting male end 218, and then the test module 3 is fixed on the adjustment module 2.

The first detection point 303 is arranged on the test module body 301.

The first aviation socket 304 is arranged on the test module body 301. In this embodiment, the test module 3 and the main body module 1 are connected through a connecting wire (not shown). Specifically, the first aviation socket 101 and the second aviation socket 304 are connected through a connecting wire. The connecting line is a quick plug-in line.

Figure 10:
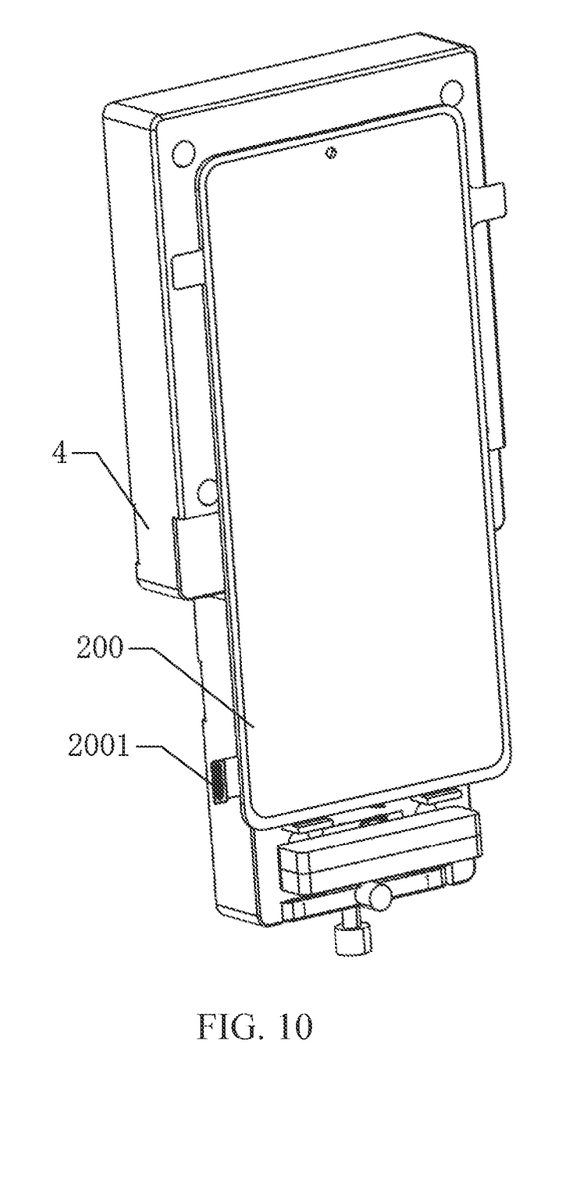
FIG. 10 is a schematic diagram of a three-dimensional structure of a carrier module of a lighting fixture of the present invention.

As shown in FIG. 2 and FIG. 10, the carrier module 4 is installed on the body module 1. The display screen 200 is detachably installed on the carrier module 4.

As shown in FIG. 2 and FIG. 10, the display screen 200 has a second detection point 2001. The second detection point 2001 is correspondingly connected to the first detection point 303.

The control device 5 is connected to the body module 1, turns on the control device 5, starts the lighting test on the display screen 200 on the lighting fixture 110, turns off the control device 5, and stops the lighting test on the display screen 200 on the lighting fixture 110.

Figure 11:
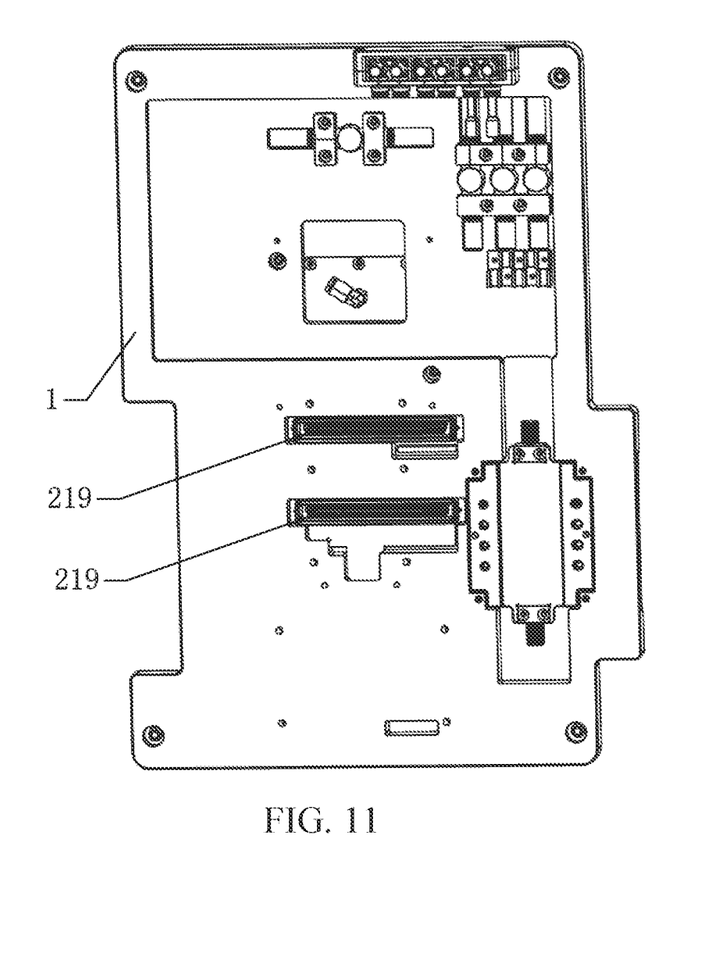
FIG. 11 is a three-dimensional structural diagram of a body module of a lighting fixture of the present invention.

As shown in FIG. 11, the lighting fixture 110 further includes an adapter board 219. The adapter board 219 is disposed on the bottom surface of the body module 1. Therefore, the contact damage of the adapter board 219 in use can be reduced, the adapter board 219 is wear-resistant, the service life is increased, and the test result is more stable.

When in use, the display screen 200 to be tested is installed on the carrier module 4. Open the two-position two-way valve and the gas path is connected. Intake air into the Z-direction cylinder barrel 2171 and push the Z-direction piston 2172 to move upward. The Z-direction piston 2172 pushes the Z-direction piston rod 2173 to move upward. The end of the Z-direction piston rod 2173 away from the Z-direction piston 2172 pushes up the end of the upper clamping block 213 close to the test module 3. The elastic member 216 is in a compressed state. The upper clamping block 213 drives the indenter 215 to lift up. The first air pipe 2114 takes air into the cylinder barrel 2111 into the X direction, and the second air pipe 2115 exhausts air to the outside, so that the X direction cylinder slider 210 slides away from the test module 3. Connect the connecting female end 302 on the test module 3 to the connecting male end 218 on the adjustment module 2. Adjust the first adjusting bolt 2043 to push the Y-direction slider 202 to slide. This makes the first detection point 303 of the test module 3 correspond to the second detection point 2001 on the display screen 200 in the Y direction. Then tighten the first fixing screw 205 so that the Y-direction slider 202 remains unchanged in the Y-direction. Then adjust the second adjusting bolt 2083 to push the X-direction slider 206 to slide. This makes the first detection point 303 of the test module 3 correspond to the second detection point 2001 on the display screen 200 in the X direction. Then tighten the second fixing screw 209 so that the X-direction slider 206 remains unchanged in the X-direction. The second air pipe 2115 enters X into the cylinder barrel 2111, and the first air pipe 2114 exhausts outward. This makes the X-direction cylinder slider 210 slide toward the test module 3. Close the two-position two-way valve, the gas path is not connected. The third air pipe 2174 exhausts outward, and the Z-direction piston 2172 moves downward. The indenter 215 drops, and the indenter 215 presses the first detection point 303 and the second detection point 2001 tightly. The first aviation socket 304 and the second aviation socket 101 are connected with a connecting wire, the control device 5 is turned on, and the lighting test of the display screen 200 on the lighting fixture 110 is started.

When changing the display screen 200 of different specifications for testing, open the two-position two-way valve and the gas path is connected. Intake air into the Z-direction cylinder barrel 2171 and push the Z-direction piston 2172 to move upward. The Z-direction piston 2172 pushes the Z-direction piston rod 2173 to move upward. The end of the Z-direction piston rod 2173 away from the Z-direction piston 2172 pushes up the end of the upper clamping block 213 close to the test module 3. The elastic member 216 is in a compressed state. The upper clamping block 213 drives the indenter 215 to lift up. The first air pipe 2114 takes air into the cylinder barrel 2111 into the X direction, and the second air pipe 2115 exhausts air to the outside, so that the X direction cylinder slider 210 slides away from the test module 3. Remove the original display screen, replace with a new display screen, and install the test module 3 matching the new specification display screen on the adjustment module 2.

In summary, the lighting fixture 110 of this embodiment mounts the display screen 200 on the carrier module 4. The test module 3 corresponding to the display screen 200 is installed on the adjustment module 2. The first detection point 303 of the test module 3 is correspondingly connected to the second detection point 2001 on the display screen 200 through the adjustment module 2. This can improve the alignment accuracy of the first detection point 303 and the second detection point 2001 and improve the detection efficiency.

The lighting fixture 110 of this embodiment can be adjusted accurately and quickly switch display screens 200 of different specifications for lighting testing. This reduces the replacement time of the lighting fixture 110 during the lighting test of the display screens 200 of different specifications and improves the replacement efficiency. This enhances the versatility of the lighting fixture 110 and improves the repetitive utilization of the lighting fixture 110. This reduces the cost of the lighting fixture 110. This reduces the types of lighting fixtures 110 and reduces the occupation of the company's inventory space. This reduces the production cost of the enterprise.

The multi-station lighting system of the present invention is spliced by multiple lighting fixtures to light up multiple display screens of multiple specifications at a time or multiple display screens of the same specification at a time, thereby improving lighting efficiency.

Embodiment 2

Figure 12:
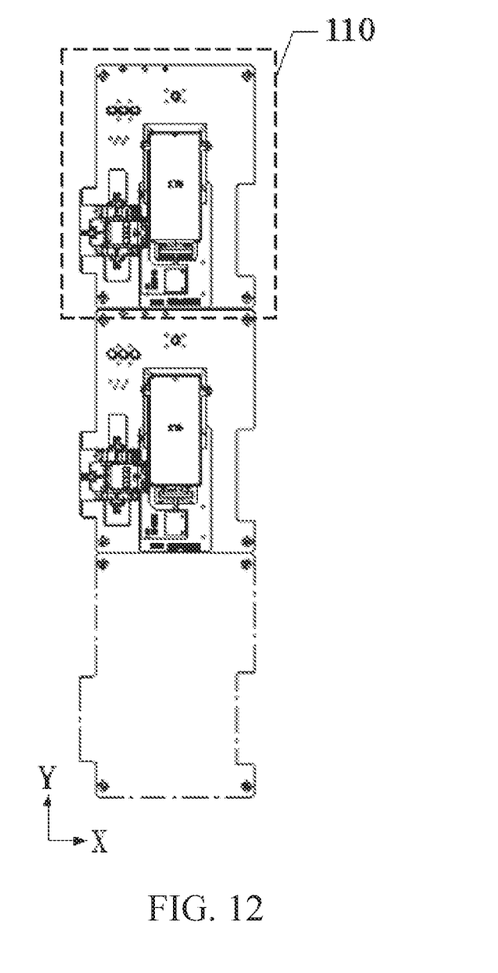
FIG. 12 is a schematic plan view of a multi-station lighting system of a second embodiment.

As shown in FIG. 12, the embodiment 2 includes most of the technical features of the embodiment 1. The difference between the embodiment 2 and the embodiment 1 is that the multiple lighting fixtures 110 in the embodiment 2 are spliced with each other and arranged along the Y direction.

The multi-station lighting system 100 of this embodiment is spliced by a plurality of lighting fixtures 110 to light up display screens 200 of multiple specifications at a time or multiple display screens 200 of the same specification at a time to improve lighting efficiency.

Embodiment 3

Figure 13:
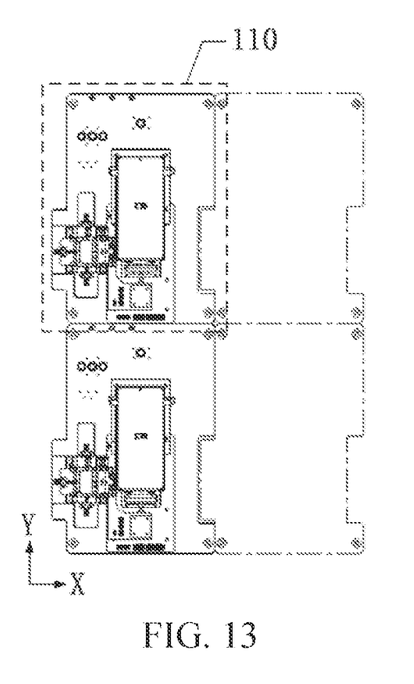
FIG. 13 is a schematic plan view of a multi-station lighting system of a third embodiment.

As shown in FIG. 13, the embodiment 3 includes most of the technical features of the embodiment 1. The difference between the embodiment 3 and the embodiment 1 is that the multiple lighting fixtures 110 in the embodiment 3 are spliced with each other and are arranged along the X direction and the Y direction.

The multi-station lighting system 100 of this embodiment is spliced by a plurality of lighting fixtures 110 to light up display screens 200 of multiple specifications at a time or multiple display screens 200 of the same specification at a time to improve lighting efficiency.

The lighting fixture and the multi-station lighting system provided by this application are described in detail above. Specific examples are used in this article to illustrate the principle and implementation of this application. The description of the above embodiments is only used to help understand the method and core idea of the present application. In addition, for those skilled in the art, based on the idea of the present application, there will be changes in the specific implementation and the scope of application. In summary, the content of this specification should not be construed as a limitation to this application.

What is claimed is:

1. A lighting fixture for lighting a display screen, comprising:
    a body module;
    an adjustment module detachably mounted on the body module;
    a test module detachably mounted on the adjustment module;
    a carrier module mounted on the body module;
    a connecting wire connecting the test module and the body module; and
    a control device connected to the body module;
    wherein the display screen is detachably mounted on the carrier module;
    wherein the adjustment module comprises:
        an adjustment module body detachably mounted on the body module;
        a Y-direction slider slidably connected to the adjustment module body;
        a X-direction slider slidably connected to the Y-direction slider; and
        a connecting male end protruding from a side of the X-direction slider away from the adjustment module body, and being located at an end of the X-direction slider close to the test module.

2. The lighting fixture according to claim 1, wherein the test module comprises:
    a test module body;
    a connecting female end disposed on the test module body and correspondingly connected to the connecting male end;
    a first detection point set on the test module body; and
    a first aviation socket disposed on the test module body.

3. The lighting fixture according to claim 2, wherein the display screen has a second detection point, and the second detection point is correspondingly connected to the first detection point.

4. The lighting fixture according to claim 2, further comprising a second aviation socket on the body module;
    wherein the connecting wire connects the first aviation socket and the second aviation socket.

5. The lighting fixture according to claim 1, wherein the adjustment module further comprises:
    an X-direction cylinder slider slidably connected to the X-direction slider;
    an X-direction cylinder mounted on the X-direction cylinder slider to drive the X-direction cylinder slider to slide.

6. The lighting fixture according to claim 5, wherein the X-direction cylinder comprises:
    an X-direction cylinder barrel located in the X-direction cylinder slider;
    an X-direction piston located in the X-direction cylinder barrel;
    an X-direction piston rod, wherein one end of the X-direction piston rod is connected to the X-direction piston, and another end of the X-direction piston rod is fixed to an end of the X-direction cylinder slider away from the test module;
    a first air pipe connected to an end of the X-direction cylinder barrel away from the test module; and
    a second air pipe connected to an end of the X-direction cylinder barrel close to the test module.

7. The lighting fixture according to claim 5, wherein the adjustment module further comprises:
    a lower clamping block mounted on the X-direction cylinder slider;
    an upper clamping block disposed opposite to the lower clamping block;
    a connecting shaft connecting the upper clamping block and the lower clamping block;
    an indenter detachably mounted on an end of the upper clamping block close to the test module;
    an elastic member located at an end of the upper clamping block away from the test module and connected between the upper clamping block and the lower clamping block.

8. The lighting fixture according to claim 7, wherein the adjustment module further comprises:
    at least one Z-direction cylinder mounted on the X-direction cylinder slider;
    the Z-direction cylinder comprises:
    a Z-direction cylinder barrel located in the X-direction cylinder slider;
    a Z-direction piston located in the Z-direction cylinder barrel;
    a Z-direction piston rod, wherein an end of the Z-direction piston rod is connected to the Z-direction piston, and another end of the Z-direction piston rod abuts against a surface of the upper clamping block on a side facing the lower clamping block; and
    a third air pipe connected to a bottom of the Z-direction cylinder barrel.

9. The lighting fixture according to claim 1, wherein the adjustment module further comprises:
    a first adjustment device configured to drive the Y-direction slider to slide;
    the first adjustment device comprises:
    two first supports respectively mounted at both ends of the Y-direction slider;
    a first adjusting screw rod rotatably connected to the two first supports; and
    two first adjusting bolts respectively connected to both ends of the first adjusting screw rod;
    wherein the Y-direction slider is provided with a first threaded hole matched with the first adjusting screw.

10. The lighting fixture according to claim 9, wherein the adjustment module further comprises:
    a second adjustment device configured to drive the X-direction slider to slide;
    the second adjustment device comprises:
    a second support mounted at an end of the X-direction slider away from the test module;
    a second adjusting screw rod rotatably connected to the second support; and
    a second adjusting bolt connected to an end of the second adjusting screw rod away from the test module;
    wherein the X-direction slider is provided with a second threaded hole matched with the second adjusting screw.

11. The lighting fixture according to claim 10, wherein the adjustment module further comprises:
    a first fixing screw mounted on the first support and used to lock or loosen the first adjusting screw; and
    a second fixing screw mounted on the second support and used to lock or loosen the second adjusting screw.

12. The lighting fixture according to claim 1, wherein the adjustment module further comprises:
    a first cross roller guide rail disposed between the Y-direction slider and the adjustment module body;
    a second cross roller guide rail disposed between the X-direction slider and the Y-direction slider.

13. A multi-station lighting system, comprising:
    a plurality of mutually spliced lighting fixtures according to claim 1; and a master control device connected to the control device of each lighting fixture.

* * * * *